J. A. Currie.
Corn Planter.
No. 94,289. Patented Aug. 31, 1869.
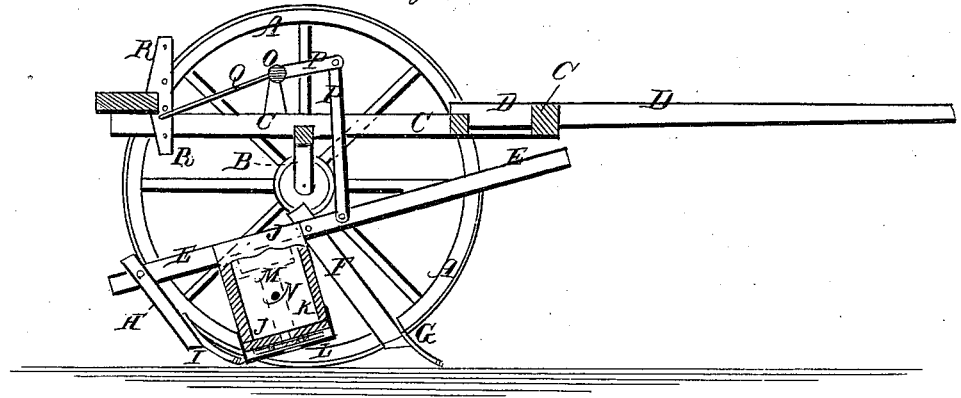
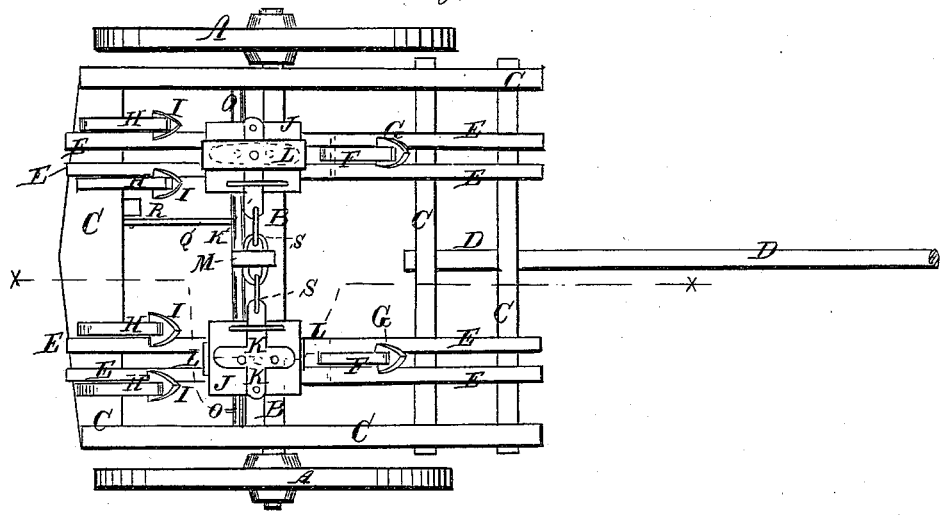
Witnesses:
Chas. Nida
Hinchman
Inventor:
J. A. Currie
Per Munn & Co.
Attorneys.

UNITED STATES PATENT OFFICE.

JAMES A. CURRIE, OF XENIA, OHIO.

IMPROVEMENT IN COMBINED PLANTER AND CULTIVATOR.

Specification forming part of Letters Patent No. 94,289, dated August 31, 1869.

*To all whom it may concern:*

Be it known that I, JAMES A. CURRIE, of Xenia, in the county of Greene and State of Ohio, have invented a new and useful Improvement in Combined Planter and Cultivator; and I do hereby declare that the following is a full, clear, and exact description thereof, which will enable others skilled in the art to make and use the same, reference being had to the accompanying drawings, forming part of this specification, in which—

Figure 1 is a detail sectional view of my improved machine, taken through the line $x\ x$ of Fig. 2. Fig. 2 is an under-side view of the same.

Similar letters of reference indicate corresponding parts.

My invention has for its object to furnish a simple, convenient, strong, and effective machine, which shall be so constructed and arranged that it may be readily adjusted for use as a planter or cultivator, doing its work equally well in either capacity; and it consists in the construction and combination of the various parts of the machine, as hereinafter more fully described.

A are the wheels of the machine, which are connected with and revolve upon the journals of the axle B in the ordinary manner. The axle B, near each wheel, is bent twice at right angles to raise the middle part of said axle, to allow space beneath it for the operating parts of the machine.

C is the frame of the machine, the middle parts of the side bars of which are securely attached to the axle B, and to the forward cross-bars of which is attached the tongue D. E are the plow beams, the forward ends of which are pivoted to the forward part of the frame C. The beams E are arranged in pairs, as shown in Fig. 2, the beams of each pair being placed at such a distance apart as to receive the standard F of the furrowing-plow G, which is attached to and between the said beams. To the outer sides of the rear ends of each of the beams E are attached the standards H of the rear or covering plows I.

J are the seed-hoppers, which are attached to the beams E between the standards F and H. In the bottom of each hopper J are formed two holes, through which the seed passes to the dropping-plate K, which is pivoted to the bottom of the hopper and works in the space between the bottom of the said hopper J and the plate L, the ends of which are turned upward and are secured to the front and rear sides of said hopper.

In the plate L, directly beneath the center of the space between the holes in the bottom of the hopper J, is formed a hole through the plate L, through which the seed drops to the ground.

In each of the dropping-plates K are formed two holes, so arranged as to alternately receive seed from the holes in the bottom of the hoppers J and convey it to the hole in the plate L, so that the seed for a hill may be dropped by each plate K at each of its movements.

The inner end of each of the dropping-plates K is connected, by a jointed or link connecting-bar, S, with the lower end of the foot-lever M, which is hung upon and pivoted to the rod N, and the upper end of which extends up into such a position that it may be reached and operated by the driver with his foot.

The ends of the rod N are secured to the hoppers J, so that the said rod not only supports the foot-lever M, but also connects the hoppers J and holds them in their proper relative positions.

O is a shaft, pivoted above the frame C to suitable supports attached to said frame, and which is connected with the plow-beams E by the jointed connecting-bars P, so that the plows may be raised from the ground or adjusted to work at any desired depth in the ground by operating the said shaft O.

Q is a lever, the forward end of which is rigidly connected with the shaft O, and the rear end of which extends back into such a position that it may be conveniently reached and operated by the driver from his seat with his foot.

The lever Q is secured in place when adjusted to hold the plows, adjusted to work at any desired depth in the ground, or, when raised from the ground, by resting against a pin passed through one or the other of the holes formed through the post R, attached to the frame of the machine at the side of the driver's seat.

When the machine is to be used as a cultivator, the forward plow-standards, F, are detached from between the beams E, and are secured to the inner side of the inner beam of each pair of beams, and the inner rear plow-standards are removed. The machine is then ready for use as a cultivator.

Having thus described my invention, I claim as new and desire to secure by Letters Patent—

1. The combination of the plow-beams E, arranged in pairs, the front plow-standards, F, whether placed between or at the side of the pair of plow-beams E, rear plow-standards, H, whether one or both are used, and seed-hoppers J with each other and with the frame C and axle B, substantially as herein shown and described, and for the purpose set forth.

2. The combination of the pivoted perforated dropping-plate K, perforated supporting-plate L, jointed connecting-bars S, and foot-lever M with each other and with the perforated bottoms of the seed-hoppers J, substantially as herein shown and described, and for the purpose set forth.

3. The combination of the jointed connecting-bars P, shaft O, lever Q, and adjusting-post R with each other and with the pairs of plow-beams E and frame C, substantially as herein shown and described, and for the purposes set forth.

JAMES A. CURRIE.

Witnesses:
ROLAND C. KYLE,
WM. P. ANDERSON.